United States Patent [19]

Fukuda

[11] Patent Number: 5,090,537
[45] Date of Patent: Feb. 25, 1992

[54] TWIN CLUTCH

[75] Inventor: Yoshinobu Fukuda, Neyagawa, Japan

[73] Assignee: Kabushiki Kaisha Daikin Seisakusho, Osaka, Japan

[21] Appl. No.: 621,207

[22] Filed: Dec. 3, 1990

[30] Foreign Application Priority Data

Dec. 4, 1989 [JP] Japan .................. 1-315559

[51] Int. Cl.⁵ .................................. F16D 13/50
[52] U.S. Cl. ......................... 192/70.27; 192/70.18; 192/70.25; 192/70.28; 192/70.29
[58] Field of Search ............ 192/70.27, 70.18, 70.25, 192/70.28

[56]  References Cited

U.S. PATENT DOCUMENTS

| | | | |
|---|---|---|---|
| 2,182,387 | 12/1939 | Probst | 192/70.28 |
| 3,175,664 | 3/1965 | Ramsel | 192/70.28 |
| 3,360,089 | 12/1967 | Cockerill et al. | 192/111 A X |
| 3,537,556 | 11/1970 | Pfeffer | 192/70.28 |
| 3,871,499 | 3/1975 | Kazuma | 192/70.29 |
| 4,339,023 | 7/1982 | Maycock | 192/70.25 |
| 4,431,097 | 2/1984 | Scheer | 192/70.25 X |
| 4,437,555 | 3/1984 | Tomm et al. | 192/70.28 X |
| 4,751,990 | 6/1988 | Schraut et al. | 192/70.27 |
| 4,809,834 | 5/1989 | Channing | 192/70.27 |
| 4,848,555 | 7/1989 | Riese et al. | 192/70.25 |

FOREIGN PATENT DOCUMENTS

| | | | |
|---|---|---|---|
| 126188 | 11/1984 | European Pat. Off. | 192/70.18 |
| 1476304 | 6/1977 | United Kingdom | 192/70.18 |
| 2055997 | 3/1981 | United Kingdom | 192/70.18 |
| 2087002 | 5/1982 | United Kingdom | 192/70.18 |
| 2103312 | 2/1983 | United Kingdom | 192/70.28 |

Primary Examiner—Leslie A. Braun
Assistant Examiner—Nicholas Whitelaw
Attorney, Agent, or Firm—Armstrong, Nikaido, Marmelstein, Kubovcik & Murray

[57] ABSTRACT

A twin clutch having two clutch discs between a flywheel and a pressure plate and having an intermediate plate between the two clutch discs. In an engaging operation of the clutch, a flywheel-side clutch disc is first held between the intermediate plate and the flywheel, and a pressure-plate-side clutch disc is then held between the pressure plate and the intermediate plate.

3 Claims, 5 Drawing Sheets 1 flywheel
2 pressure plate
3,4 clutch disc
5 intermediate plate
50 roll pin
60 adjusting pin

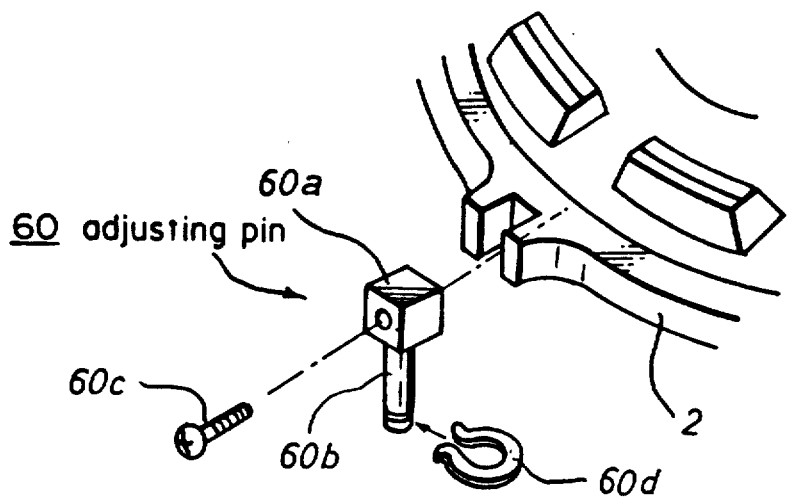
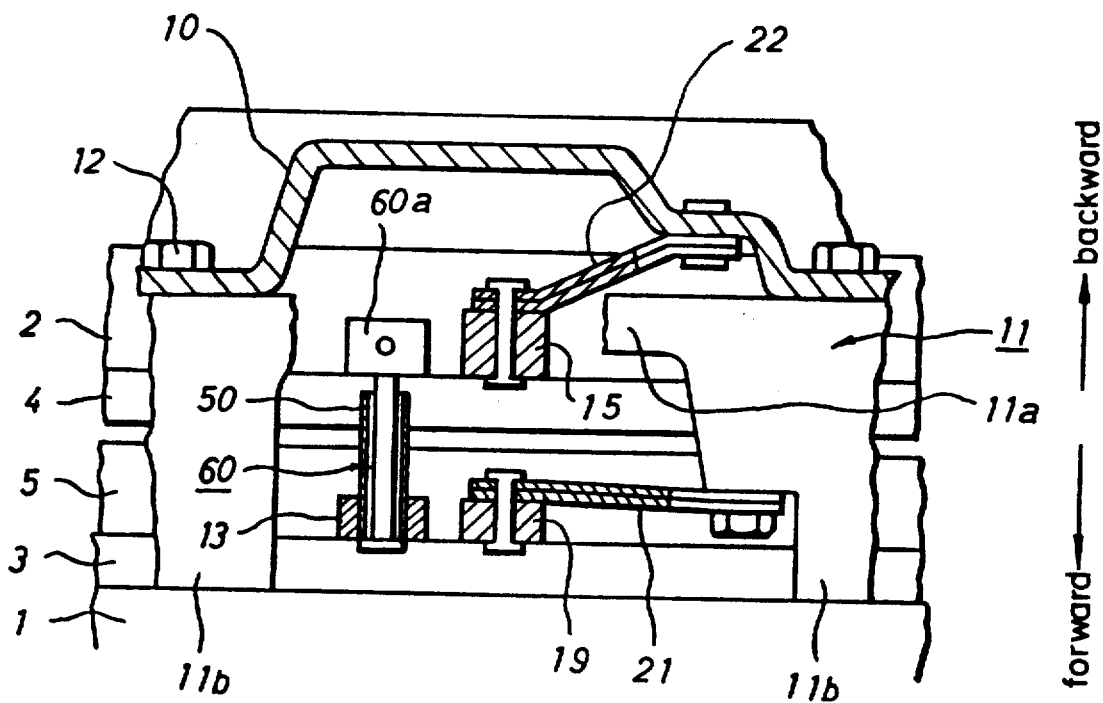

TWIN CLUTCH

BACKGROUND OF THE INVENTION

1. Industrial Useful Field

This invention relates to a twin clutch having two clutch discs with an intermediate plate held between a pressure plate and a flywheel.

2. Prior Art

FIG. 10 is a vertical sectional partial view showing a conventional twin clutch. This twin clutch is of a pull-type having such a structure as fitting a roll pin to an intermediate plate so that a disengaging allowance of the intermediate plate can be secured and the intermediate plate can follow up wear of facings of clutch disc. In this figure, 1 is a flywheel, 2 is a pressure plate, 3 and 4 are clutch discs, 5 is an intermediate plate, 10 is a clutch cover and 30 is a diaphragm spring. The clutch cover 10 is bolted rigidly to the flywheel 1 through a flywheel ring 11 to compose a flywheel assembly. The flywheel ring 11 consists of a disc-like annular body 11a and bosses 11b protruding in an axial direction at circumferential plural places of the body, and the bosses 11b are bolted to the flywheel 1. The intermediate plate 5 is connected through an elastic strap (not shown) to the flywheel ring 11 so that it can not rotate relatively to the flywheel ring 11 but can move in the axial direction relatively thereto. The pressure plate 2 is connected through an elastic strap (not shown) to the clutch cover 10 so that it can not rotate relatively to the clutch cover 10 but can move in the axial direction relatively thereto. Consequently, both the pressure plate 2 and the intermediate plate 5 are urged axially to the the clutch cover side by the elastic straps respectively. Bosses 13 protruding outwardly in radial directions are provided at plural places of an outer periphery of the intermediate plate 5, and roll pins 50 are fitted in and through the bosses 13 in the axial direction. The roll pin 50 can slide relatively to the boss 13, and a load (sliding load) necessary for its sliding is so preset as to be larger than an elastic force of the elastic strap which urges the intermediate plate 5, and smaller than a pressing force applied from the diaphragm spring 30 onto the pressure plate 2. The roll pin 50 is installed in such a way that, at time of clutch engagement, one-side end face 50a is made contact with the flywheel 1 and a clearance δ forming the engaging allowance of the intermediate plate 5 is secured between the other-side end face 50b and the body 11a. The engaging allowance means an axial moving distance required for the intermediate plate 5 in a clutch engaging state to become a clutch disengaged state wherein it does not contact with the clutch discs 3 and 4 on both sides thereof.

In a clutch disengaging operation of such a twin clutch, when an inner peripheral part of the diaphragm spring 30 moves backward in the axial direction (to the clutch cover 10 side), both the pressure plate 2 and the intermediate plate 5 are moved backward by means of the respective elastic forces of the elastic straps. Thereby, the the clutch disc 3 is first disengaged from the flywheel 1, and the intermediate plate 5 is then disengaged from the clutch disc 3. In this instance, the clutch disc 4 is still held between the pressure plate 2 and the intermediate plate 5. The intermediate plate 5 stops its motion when moving backward by a length corresponding to the distance δ because the end face 50b of the roll pin 50 comes in contact with the body 11a. And, only the pressure plate 2 moves from here on so that the clutch disc 4 is disengaged from the intermediate plate 5 and the pressure plate 2 is disengaged from the clutch disc 4. FIG. 11 shows relations of a releasing distance to moving distances of the pressure plate (PP) 2 and the intermediate plate (IMP) 5, at time of the disengaging operation of the clutch.

In a clutch engaging operation, when the inner peripheral part of the diaphragm spring 30 moves forward in the axial direction (to the flywheel 1 side), the pressure plate 2 is first moved together with the clutch disc 4 to the flywheel 1 side and the clutch disc 4 comes in touch with the intermediate plate 5 which has been in the stopped state caused by the end face 50b of the roll pin 50 contacting with the body 11a. Namely, the clutch disc 4 is first held between the pressure plate 2 and the intermediate plate 5, and the intermediate plate 5 is then moved together with the clutch disc 3 so that the clutch disc 3 comes in touch with the flywheel 1. That is, the clutch disc 3 is held between the intermediate plate 5 and the flywheel 1. In this way, the pressing force of the pressure plate 2 is transmitted to the both clutch discs 3 and 4 to cause the clutch to be engaged.

In the clutch engaged state, when the facings of the clutch discs 3 and 4 are worn out respectively, the boss 13 slides relatively to the roll pin 50 so that the intermediate plate 5 moves to the flywheel 1 side, and both the pressure plate 2 and the clutch disc 4 also move to the flywheel 1 side; because the end face 50a of the roll pin 50 contacts with the flywheel 1 and the sliding load of the roll pin 50 is so preset as to be smaller than the pressing force applied from the diaphragm spring 30 onto the pressure plate 2. Namely, both the pressure plate 2 and the intermediate plate 5 move to follow up the wear of facings of the clutch discs 3 and 4.

PROBLEMS TO BE SOLVED BY THE INVENTION

In the twin clutch having the foregoing structure, the torque is first transmitted to the clutch disc 4 and then to the clutch disc 3 in the clutch engaging operation. For this reason, there have been such troubles that the clutch disc 4 has been frequently subjected to forced slipping so that wear amounts of its facings have become larger than that of the clutch disc 3, and a service life of the clutch disc 4 has become shorter than that of the clutch disc 3. Further, an axial sliding resistance between the clutch disc 4 and an output shaft (not shown) onto which the clutch disc 4 spline fits, has increased so that there has been a possibility of occurrence of so-called interlocked state.

SUMMARY OF THE INVENTION

An object of the invention is to provide a twin clutch, in which a disengaging allowance of an intermediate plate can be secured, both a pressure plate and the intermediate plate can follow up wear of facings of clutch disc, and wear amounts of facings of the two clutch discs can be equalized so as to make service lives of the two equal.

This invention relates to a twin clutch, in which two clutch discs are installed between a pressure plate and a flywheel of flywheel assembly comprising the flywheel and a clutch cover bolted thereto, an intermediate plate is installed between the both clutch discs, and the intermediate plate is connected to the flywheel assembly by a first elastic strap and the pressure plate is connected to the flywheel assembly by a second elastic strap respectively in such a manner that they can not rotate but can move in an axial direction relatively to the flywheel assembly; characterized by that the first elastic strap is so installed as to elastically press the intermediate plate together with the clutch disc onto the flywheel, a roll pin is provided on an outer peripheral part of the intermediate plate in such a manner that the pin fits in and through the outer peripheral part and its pressure-plate-side end face comes in contact with an outer peripheral part of the pressure plate in a clutch engaged state, a load necessary for sliding of the roll pin is so preset as to be larger than the foregoing elastic force of the first elastic strap and smaller than the pressing force applied from the diaphragm spring onto the pressure plate, an adjusting tool is secured onto the outer peripheral part of the pressure plate by being inserted in the roll pin, a stopper which contacts with a flywheel-side end face of the roll pin to stop a movement of the adjusting tool in relation to the roll pin, is installed at the flywheel-side tip end of the adjusting tool, a clearance between the stopper and the above-mentioned flywheel-side end face is made equal to a disengaging allowance of the intermediate plate in the clutch engaged state, the foregoing disengaging allowance for clutch forms an axial moving distance required for the intermediate plate in the clutch engaged state to become a clutch disengaged state, and the second elastic strap is installed in place by being provided with an elastic force so that the pressure plate together with the intermediate plate connected thereto through the adjusting tool and the roll pin are kept at the clutch disengaged state.

In the present invention, the intermediate plate is moved to the flywheel side by means of the elastic force of the first elastic strap when the pressure plate moves to the flywheel side, in the clutch engaging operation. After that, the clutch disc on the flywheel side is first held between the intermediate plate and the flywheel, and the clutch disc on the pressure plate side is then held between the pressure plate and the intermediate plate.

When the facings of the both clutch discs are worn out in the clutch engaged state, the intermediate plate is pushed forth to the flywheel side by the first elastic strap. The pressure plate moves to the flywheel side while sliding the roll pin. Accordingly, the pressure plate and the intermediate plate follow up the wear of facings. Even in this instance, the clearance between the stopper for the adjusting tool and the flywheel-side end face of the roll pin is secured by an amount corresponding to the disengaging allowance of the intermediate plate.

BRIEF DESCRIPTION OF THE DRAWINGS

FIG. 3 is an oblique exploded view showing an adjusting pin.

FIG. 4 and FIG. 5 are schematic sectional partial plan views showing respective states of clutch engaging operations.

DETAILED DESCRIPTION OF THE INVENTION

Embodiment

Figure 1:
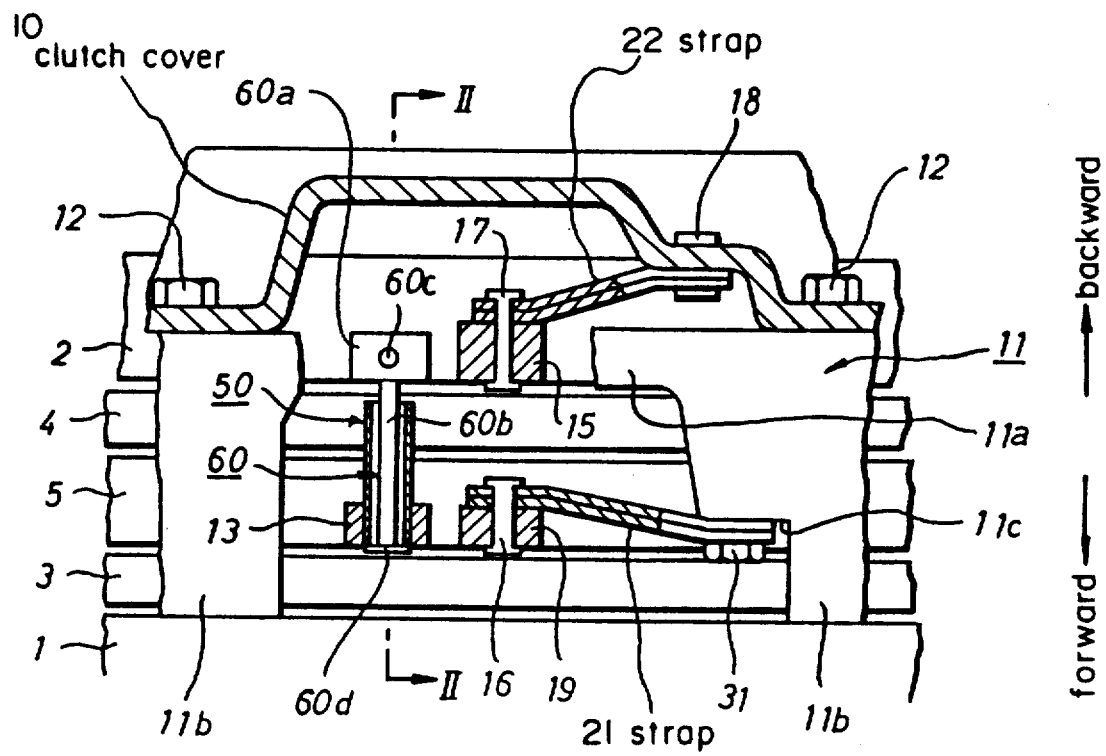
FIG. 1 is a schematic sectional partial plan view showing the twin clutch of this invention.
Figure 2:
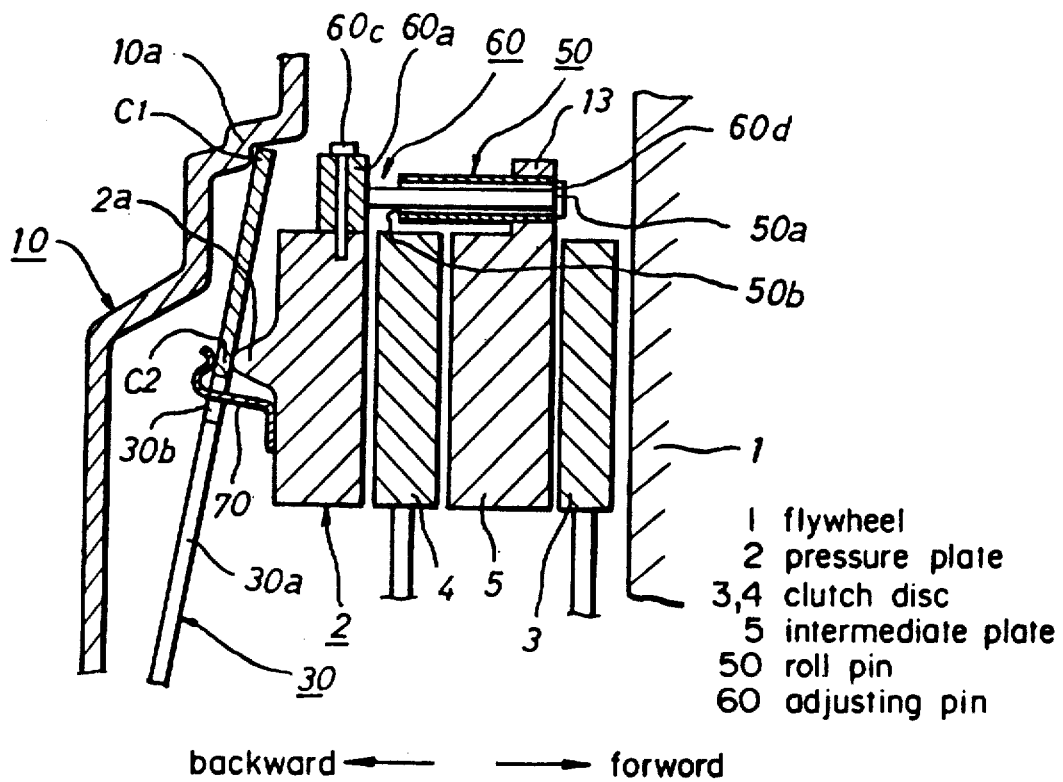
FIG. 2 is a sectional view taken along a line II—II of FIG. 1.
Figure 10:
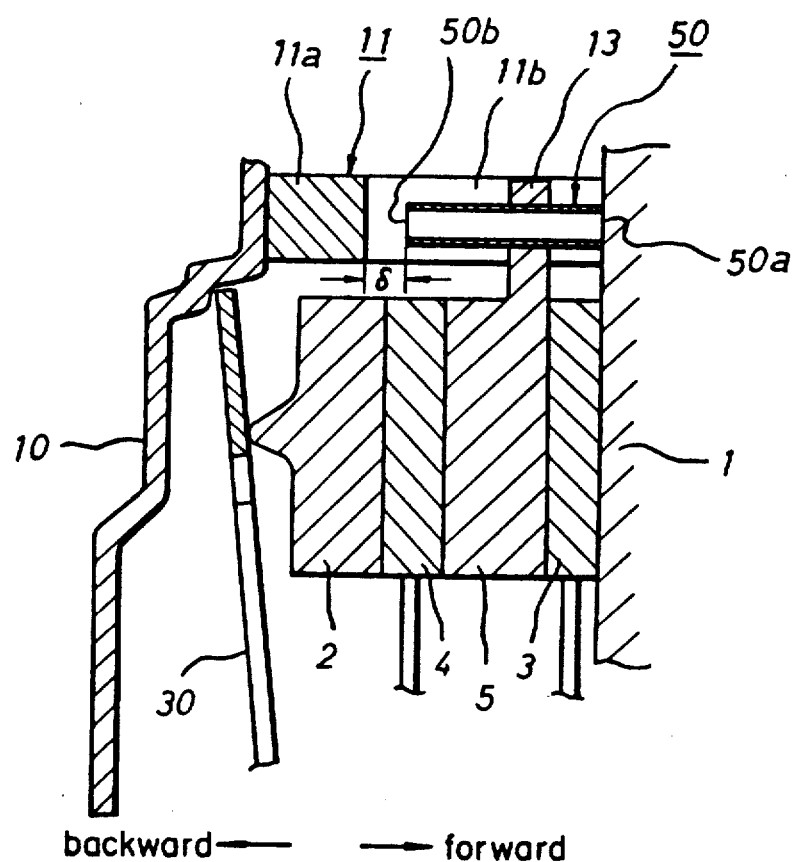
FIG. 10 is a vertical sectional view showing a conventional twin clutch.

The embodiment of this invention will be described hereunder with reference to the attached drawings. FIG. 1 is the schematic sectional partial plan view showing the twin clutch of this invention and FIG. 2 is the sectional view taken along the line II—II of FIG. 1. This twin clutch is of the pull-type. In the figures, characters same as FIG. 10 indicate the same or corresponding ones. Two clutch discs 3 and 4 are installed between a flywheel 1 and a pressure plate 2, and an intermediate plate 5 is installed between the both clutch discs 3 and 4. The clutch discs 3 and 4 are provided with facings on both surfaces at their outer peripheral parts, and spline fit onto an output shaft (not shown) at their inner peripheral parts.

A clutch cover 10 is rigidly bolted to the flywheel 1 through a flywheel ring 11 so as to compose a flywheel assembly. Namely, the flywheel ring 11 is composed of a disc-like annular body 11a which is located at a position radially outer than the clutch discs 3 and 4, and bosses 11b which are provided on the body 11a integrally and protrusively in axial direction at plural places with spaces left therebetween in circumferential direction of the body 11a. The clutch cover 10 is secured by bolts 12 to a rear surface (surface opposite to the boss 11b) of the body 11a, and the bosses 11b are rigidly bolted to the flywheel 1.

Two bosses 13 and 19, which protrude outwardly in radial directions between two adjacent bosses 11b, are provided integrally with the intermediate plate 5 side by side in circumferential direction at plural places (only one place is shown here) on an outer periphery of the intermediate plate 5. One end of a first elastic strap 21 is fastened by a rivet 16 to a rear face of the boss 19. The strap 21 extends in an approximately tangential direction of clutch and the other end thereof is fastened by a bolt 31 to a side-stepped part of the boss 11b, so that the intermediate plate 5 can not rotate but can move in the axial direction relatively to the flywheel ring 11. The strap 21 is provided with an elastic force of such an extent that the intermediate plate 5 itself can be pressed on the flywheel 1 together with the clutch disc 3.

Figure 6:
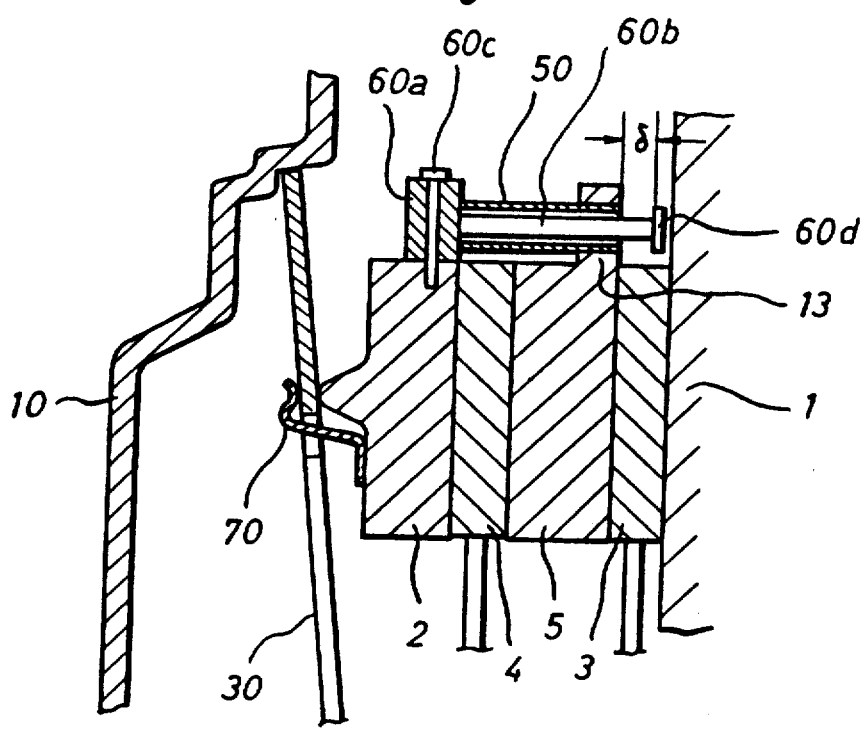
FIG. 6 is a sectional view taken along a line IV—IV of FIG. 5.

A roll pin 50 is inserted in the boss 13 so as to slide freely in its axial direction. A load required for the roll pin 50 to slide (sliding load) is so preset as to be larger than the foregoing elastic force of the strap 21 but smaller than the pressing force applied from a diaphragm spring 30 onto the pressure plate 2. On the other hand, an adjusting pin 60 is secured to an outer periphery of the pressure plate 2. The adjusting pin 60 is composed of a rectangular parallelopiped base 60a and a pin 60b extending from the base 60a as illustrated by FIG. 3, and the base 60a is fastened by a screw 60c to the outer periphery of the pressure plate 2 under a state where the pin 60b is inserted in the roll pin 50. A snap ring 60d is fitted to the tip end of the pin 60b. The snap ring 60d, which contacts with the flywheel 1 side end face 50a of the roll pin 50 to function as a stopper for stopping a movement of the adjusting pin 60 relatively to the roll pin 50, is so fitted as to provide a clearance δ equal to a disengaging allowance of the intermediate plate 5 between it and the end face 50a in the clutch engaged state as illustrated by FIG. 6. The disengaging allowance (clearance δ) means an axial distance required for the intermediate plate 5 in the clutch engaged state to become the clutch disengaged state where it does not touch with the both clutch discs 3 and 4. The roll pin 50 is so installed as to be in contact with the base 60a at its pressure plate 2 side end face 50b under the clutch engaged state.

A boss 15 protruding outwardly in the radial direction is integrally provided on the pressure plate 2 in the vicinity of the base 60a at the outer periphery of the pressure plate 2. The boss 15 is provided in the same quantity as that of the boss 19, and one end of a second elastic strap 22 is secured by a rivet 17 to a rear face of boss. The strap 22 extends in an approximately tangential direction of clutch, and its other end is fastened by a rivet 18 to an inside surface of the clutch cover 10. By this structure, the pressure plate 2 can not rotate but can move in the axial direction relatively to the clutch cover 10. The strap 22 is provided with an elastic force which is able to maintain the clutch disengaged state shown in FIG. 1 and FIG. 2 by pulling the intermediate plate 5 backward through the adjusting pin 60 and the roll pin 50, on which the pressing force is applied from the strap 21.

The diaphragm spring 30 is installed between the pressure plate 2 and the clutch cover 10 as illustrated by FIG. 2. The diaphragm spring 30 is supported by a corner 10a of the clutch cover 10 at its outer peripheral end C1 and is brought into contact with a fulcrum land 2a of the pressure plate 2 at its intermediate part C2, and its inner peripheral part is connected to a releasing mechanism (not shown). The intermediate part C2 is pressed on the fulcrum land 2a by a clip 70 secured to the pressure plate 2. The clip 70 is so installed as to pass through an enlarged opening 30b provided at an outside end of a slit 30a of the diaphragm spring 30. The diaphragm spring 30 has such a structure that, in the clutch engaging operation, its inner peripheral part moves forward with the outer peripheral end C1 utilized as a fulcrum point to permit the intermediate part C2 to urge the pressure plate 2 toward the flywheel 1 side.

Function will be described hereunder. In the clutch disengaged state, as illustrated by FIG. 1 and FIG. 2, the snap ring 60d of the adjusting pin 60 is made contact with the end face 50a of the roll pin 50, so that the intermediate plate 5 is pulled backward through the roll pin 50 and the adjusting pin 60 to be kept at a position where it is disengaged from the clutch disc 3.

Figure 5:
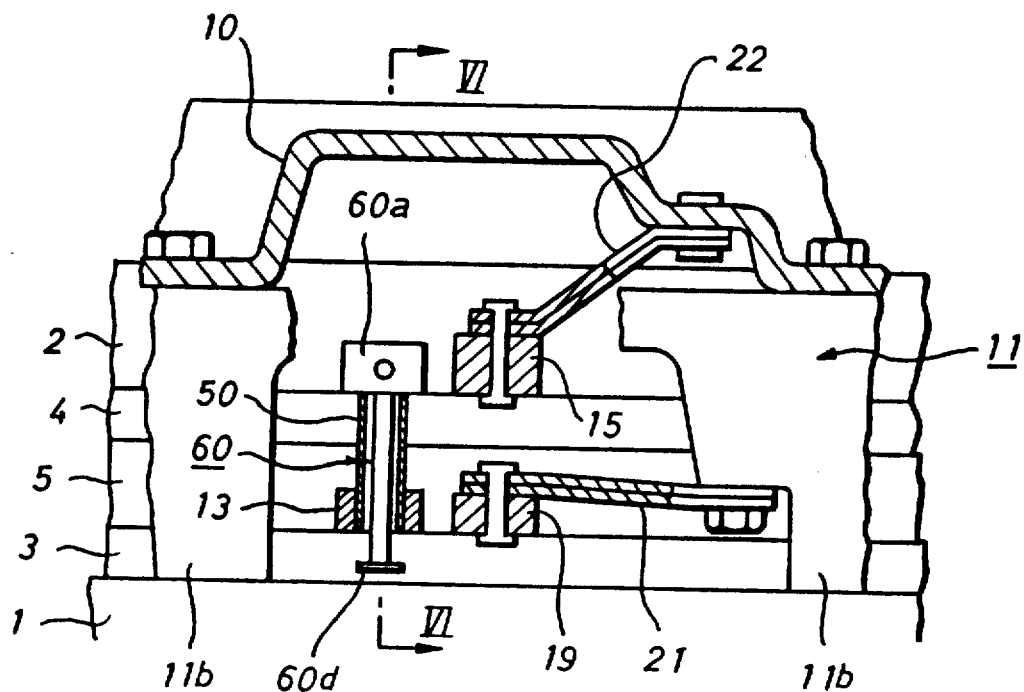

In the clutch engaging operation, when the pressing force is applied from the diaphragm spring 30 to the pressure plate 2, the pressure plate 2 is gradually moved forward and at the same time the intermediate plate 5 is gradually moved forward, i.e. to the flywheel 1 side, by the elastic force of the strap 21 while having the snap ring 60d contact with the end face 50a. In this instance, the roll pin 50 does not slide relatively to the boss 13 because its sliding load is so preset as to be larger than the elastic force of the strap 21. After that, the clutch disc 3 first comes in touch with the intermediate plate 5, and then with the flywheel 1. In this instance, the pressure plate 2 is contacting with the clutch disc 4 but the clutch disc 4 is not contacting with the intermediate plate 5. Accordingly, the pressing force of the pressure plate 2 is not transmitted to the clutch disc 3. This state is shown in FIG. 4. The pressure plate 2 further moves forward to cause the clutch disc 4 to contact with the intermediate plate 5. This state is shown in FIG. 5. FIG. 6 is the sectional view taken along the line VI—VI of FIG. 5. After that, the pressing force of the pressure plate 2 is transmitted to the clutch discs 3 and 4. Namely, in the clutch engaging operation, the clutch disc 3 is first held between the intermediate plate 5 and the flywheel 1, and the clutch disc 4 is then held between the pressure plate 2 and the intermediate plate 5. Consequently, the frequency of forced sliding of the clutch disc 4 becomes small as compared with the clutch disc 3, and a chance for the clutch disc 4 to slide on the output shaft while receiving the pressing load from the pressure plate 2 is reduced so that a possibility of occurrence of the interlocked state is minimized. Incidentally, there is no chance for the facings of the clutch disc 3 to be worn out much, because the clutch disc 3 is cooled more efficiently than the clutch disc 4 owing to its heat mass even if the clutch disc 3 is brought into the engaged state faster than the clutch disc 4.

When the facings of the clutch discs 3 and 4 are worn out in this clutch engaged state, the intermediate plate 5 is moved to the flywheel 1 side by the elastic force of the strap 21, and the pressure plate 2 is moved to the flywheel 1 side while sliding the roll pin 50 relatively to the boss 13 because the base 60a is made contact with the end face 50b of the roll pin 50 and the sliding load of the roll pin 50 is so preset as to be smaller than the pressing force applied from the diaphragm spring 30 onto the pressure plate 2. That is, the pressure plate 2 and the intermediate plate 5 move while following up the wear of facings. The clearance between the end face 50a and the snap ring 60d is always maintained because the end face 50b of the roll pin 50 is in the state of contacting with the base 60a even when the pressure plate 2 and the intermediate plate 5 move while following up the wear as mentioned above.

Figure 7:
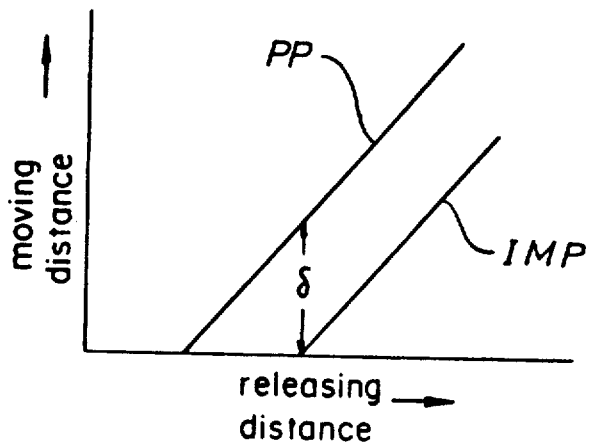
FIG. 7 is a graph showing relations of a releasing distance to moving distances of pressure plate (PP) and intermediate plate (IMP) in a clutch disengaged state.

In the clutch disengaging operation in the next stage, the pressure plate 2 is gradually moved backward by the elastic force of the strap 22 because no pressing force is applied from the diaphragm spring 30. In this instance, the intermediate plate 5 does not move backward because it is urged to the flywheel 1 side by the elastic force of the strap 21. Accordingly, the clutch disc 4 is first disengaged from the intermediate plate 5. When the pressure plate 2 is moved backward by the clearance δ to bring the snap ring 60d into contact with the end face 50a, the intermediate plate 5 is pulled by the pressure plate 2 through the adjusting pin 60 and the roll pin 50 to be moved backward. In this way, the contact between the clutch disc 3 and the flywheel 1, the contact between the intermediate plate 5 and the clutch disc 3, and the contact between the pressure plate 2 and the clutch disc 4 are released in succession, so that the clutch disengaged state shown in FIG. 1 and FIG. 2 is brought about. FIG. 7 shows the relations of releasing distance to moving distances of pressure plate (PP) 2 and intermediate plate (IMP) 5 in the clutch disengaged state.

EFFECT OF THE INVENTION

As described above, the following effects can be obtained according to this invention.

(1) In the clutch engaging operation, the clutch disc 3 is first held between the intermediate plate 5 and the flywheel 1, and the clutch disc 4 is then held between the pressure plate 2 and the intermediate plate 5. Therefore, the frequency of forced sliding of the clutch disc 4 can be reduced as compared with the clutch disc 3, and the service lives of the clutch discs 3 and 4 can be equalized by making the wear amounts of the two equal. Further, the occurrence of interlocked state caused by the clutch disc 4 can be avoided.

(2) It becomes possible to secure the disengaging allowance of the intermediate plate 5, because the mechanism comprising the roll pin 50 and the adjusting pin 60 is incorporated and the clearance $\delta$ forming the disengaging allowance of the intermediate plate 5 is secured between the end face 50a and the snap ring 60d under the clutch engaged state.

(3) The pressure plate 2 and the intermediate plate 5 can follow up the wear of facings of the clutch discs 3 and 4, because the mechanism comprising the roll pin 50 and the adjusting pin 60 is incorporated and the sliding load of the roll pin 50 is so preset as to be larger than the elastic force of the pressure plate 2 but smaller than the pressing force applied from the diaphragm 30 onto the pressure plate 2.

ANOTHER EMBODIMENT

Figure 8:
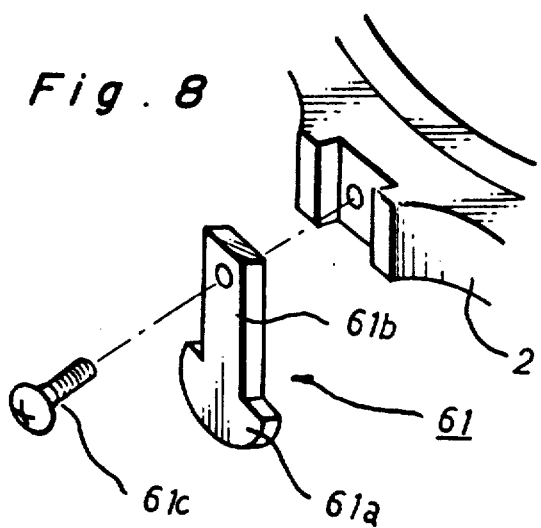
FIG. 8 is an oblique exploded view showing an adjusting plate which is another example of the adjusting pin of FIG. 3.
Figure 9:
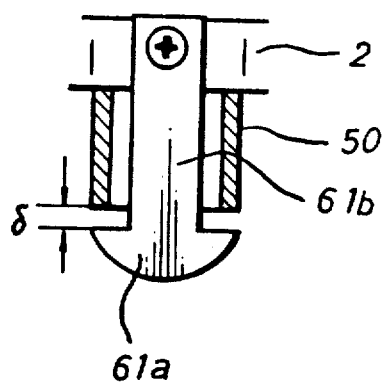
FIG. 9 is a sectional view showing the adjusting plate of FIG. 8.
Figure 11:
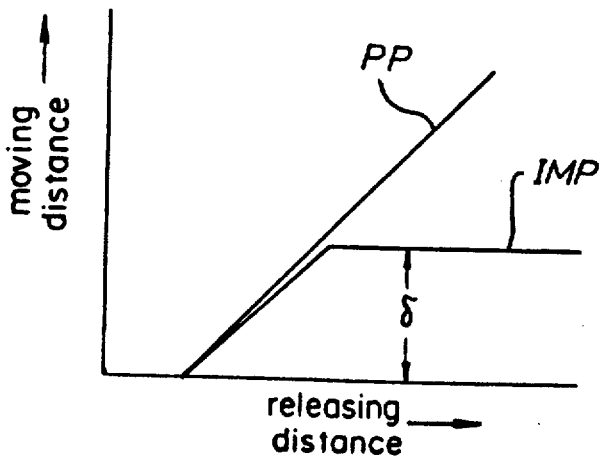
FIG. 11 is a graph showing relations of a releasing distance to moving distances of pressure plate (PP) and intermediate plate (IMP) in a clutch disengaged state of the conventional twin clutch.

An adjusting plate 61 may be used in place of the adjusting pin 60 as illustrated by FIG. 8. The adjusting plate 61 is a T-shaped plate-like body composed of a head 61a and a foot 61b, and the head 61a is so constructed as to perform the same function as the snap ring 60d of the adjusting pin 60 as illustrated by FIG. 9. 61c is a screw for fastening the foot 61b to the outer periphery of the pressure plate 2.

It goes without saying that the structure of this invention employing the roll pin 50 and the adjusting pin 60 is applicable not only to the pull-type clutch but also to a twin clutch of push-type.

What is claimed is:

1. A twin clutch, in which a pair of clutch discs are installed between a pressure plate and a flywheel of a flywheel assembly comprising the flywheel, a clutch cover bolted thereto, said pair of clutch discs between said flywheel and said clutch cover, an intermediate plate between said pair of clutch discs and a diaphragm spring between said cover and said pressure plate for engaging and disengaging said clutch, a first elastic strap connecting said intermediate plate to said flywheel assembly and a second elastic strap connecting said pressure plate to said flywheel assembly, first and second elastic straps connecting said intermediate plate and said pressure plate, respectively, to said flywheel assembly is such a manner that said intermediate plate and said pressure plate can not rotate relative to said flywheel assembly but can move in an axial direction relative to said flywheel assembly; characterized by that said first elastic strap is connected to said intermediate plate and said flywheel assembly so as to elastically press said intermediate plate together with one of said clutch discs onto said flywheel, a roll pin extending in said axial direction relative to said flywheel assembly and slidably fitted in a boss on an outer peripheral portion of said intermediate plate, an adjusting pin fitted in and passing through said roll pin, said roll pin at its pressure-plate-side end face contacting an outer peripheral part of said the pressure plate when said twin clutch is in an engaged state, a load necessary for sliding said roll pin in said boss being preset so as to be larger than an elastic force of said first elastic strap and smaller than a pressing force applied by said diaphragm spring to said pressure plate, means for securing one end of said adjusting pin to an outer peripheral part of said pressure plate with said adjusting pin passing through said roll pin, a stopper for contact with a flywheel-side end face of said roll pin and stopping movement of said adjusting pin relative to said roll pin at the flywheel-side tip end of said adjusting pin, a clearance between said stopper and said flywheel-side end face equal to a allow disengaging of said intermediate plate from a clutch engaged state, said foregoing clearance of said intermediate plate being in an axial direction and being a distance required for the intermediate plate in the clutch engaged state to become a clutch disengaged state, said second elastic strap having an elastic force so that said pressure plate together with said intermediate plate connected thereto through said adjusting pin and said roll pin are kept at the clutch disengaged state when said diaphragm spring is disengaged.

2. A twin clutch as set forth in claim 1, in which said adjusting pin includes a base fastened to an outer periphery of said pressure plate and extends from said base through said roll pin and has a snap ring fitted to a tip end of said pin for said stopping movement of said adjusting pin relative to said roll pin.

3. A twin clutch as set forth in claim 1, in which said adjusting pin is a T-shaped plate-like body composed of a head and a foot, said foot being secured to said outer peripheral part of said pressure plate with said roll pin passed through said pressure plate, said head stopping movement of said adjusting pin relative to said roll pin.

* * * * *